Patented Oct. 6, 1931

1,826,335

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE HYDROLYSIS OF CELLULOSE ACETATE

No Drawing.   Application filed December 14, 1929.   Serial No. 414,206.

This invention relates to a process for the hydrolysis of cellulose acetate and particularly to the hydrolysis of such esters in the presence of 1-4 dioxan.

There are two types of cellulose triacetate which are produced at the present time, one of which is formed in the dissolved state and the other in a fibrous form, the latter having very much the same appearance as the original cellulosic material. As is well known in this art the triacetate of cellulose in whatever form it may be produced has slight utility. It is necessary in order to render such acetates useful in the arts to hydrolyze them from the chloroform soluble cellulose triacetate to the acetone soluble cellulose acetate of lower acetyl content.

Cellulose triacetate is hydrolyzed usually by adding directly to the acetylating bath sufficient water in a suitable medium as acetic acid to destroy the acetic anhydride which has not combined with the cellulose, together with a sufficient amount of a suitable hydrolyzing catalyst. This hydrolysis is conducted at or about room temperature and is continued until the solubility desired has been obtained. In some instances, however, the cellulose ester is precipitated from the acetylating bath and from this substantially pure state is hydrolyzed by a treatment in a bath containing a solvent for the cellulose acetate, the hydrolyzing catalyst and the particular type of hydrolyst as water or alcohol that may be used. This method of procedure is generally that used when the cellulose acetate of the fibrous form is to be hydrolyzed.

Heretofore the common solvent of the ester and the other ingredients of the hydrolyzing bath has consisted almost universally of acetic acid. While its use has been satisfactory for this purpose, nevertheless, due to the extended uses of cellulose acetate and, therefore, the greater amounts of acetic acid that have been required in its manufacture and for other purposes, the price and availibility of acetic acid has, of late years, made substitutes advisable. The investigators in this field have sought efficient and available solvents but until our discovery no entirely satisfactory solvents have been found.

An object of our invention is to provide a process for the hydrolysis of cellulose triacetate and a new common solvent of the hydrolyzing ingredients and the cellulose triacetate. A further object of our invention is to provide a process for hydrolyzing cellulose triacetate in the presence of 1-4 dioxan. Further objects will hereinafter appear.

We have found that 1-4 dioxan,

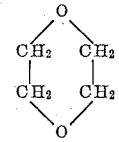

may be used for dissolving the chloroform soluble cellulose acetate and the other hydrolyzing agents such, for example, as the hydrolysts, as water or alcohol and the hydrolytic catalysts either of an acid, acid salt or alkali nature by which the cellulose triacetate may be hydrolyzed to a cellulose acetate, freely soluble in acetone. The acetone soluble product which is obtained by the hydrolysis of the cellulose triacetate is likewise soluble in the 1-4 dioxan solution.

The 1-4 dioxan solvent may be diluted, prior to its use, with glacial acetic acid, which aids in the more rapid solution of the cellulose triacetate. Water or alcohol may likewise be present in the 1-4 dioxan solvent mixture prior to its addition to the extent of not more than 10 percent by volume of the 1-4 dioxan. This characteristic is particularly desirable in a solvent to be used in lieu of acetic acid in that such a solvent must likewise be able to hold in solution a suitable amount of the hydrolyst.

After the hydrolysis has continued until the cellulose acetate has reached the required acetyl value the whole solution may be precipitated into an excess of water whereby the cellulose ester is readily separated. The advantages that may be derived from the use of 1-4 dioxan for this purpose reside in the fact that 1-4 dioxan alone is a solvent for both the triacetate and the hydrolyzed acetate, it acts as a solvent of both types of cellulose esters when it contains even as great as 10 percent of water and finally, when it is admixed with acetic acid or other lower aliphatic acids, it likewise acts in conjunction therewith as a reacting medium in which the hydrolysis of the ester may be readily conducted.

We have found that the temperature of the hydrolyzing bath should be maintained at about 50° C. and that the duration of the reaction to obtain an acetone soluble product will be from approximately 18 to 24 hours at this temperature. At a more elevated temperature the reaction will, of course, require less time for completion while, at a lower temperature, a longer period must be allowed. In any event the temperature must be kept well below the point where degradation of the cellulose acetate results.

We shall now give several examples to enable those skilled in this art to operate this process but it will be understood that we are not limited by the details therein given except as they are indicated in the appended claims.

To 50 parts of a cellulose triacetate, of the fibrous form as prepared by any of the usual acetylating baths in the presence of some non-solvent, which is therein used in sufficient proportions to prevent the solution of the esterified cellulose upon its formation, or any process for the preparation of such a cellulose triacetate in fibrous or non-fibrous form, there is added 250 parts of 1-4 dioxan containing two parts of concentrated hydrochloric acid (sp. gr. 1.19). The resulting dope which rapidly forms is placed in a suitable covered container and held at a temperature of 45 to 50° C. for a period of 20 to 24 hours. Upon precipitation in water or by spray drying of the cellulose acetate a product is obtained which is soluble in acetone.

50 parts of cellulose triacetate is dissolved in a solution containing 150 parts of 1-4 dioxan and 150 parts of glacial acetic acid into which two parts of concentrated hydrochloric acid has been added. The resulting solution is placed in a closed container and held at a temperature of 45 to 50° C. for a period of 18 to 23 hours or until the cellulose acetate has been deacetylated to the required extent. The product upon pouring, preferably in a fine stream, into warm water will readily coagulate in a form which may be thoroughly and efficiently washed. After drying, a cellulose acetate is obtained which has exceptionally good quality and which upon solution and formation into a film will have excellent transparency and flexibility.

It will be understood that the proportions of 1-4 dioxan or of the hydrolyst or hydrolyzing catalyst used in the above examples may be varied through wide limits or any type of cellulose acetate may be hydrolyzed in accordance with the principles of our process without departing from the scope of this invention or sacrificing the optimum results that may be obtained by its use.

What we claim as our invention and desire to be secured by Letters Patent of the United States is:

1. In the process for the production of cellulose acetate the step which comprises hydrolyzing cellulose acetate in the presence of 1-4 dioxan.

2. In the process for the production of cellulose acetate the step which comprises hydrolyzing an acetic acid solution of cellulose acetate in the presence of 1-4 dioxan and water.

3. In the process for the production of cellulose acetate the step which comprises hydrolyzing an acetic acid solution of cellulose acetate in the presence of 1-4 dioxan and hydrochloric acid.

4. In the process for the production of cellulose acetate the step which comprises hydrolyzing 10 parts of fibrous cellulose triacetate in a bath comprising 50 parts of 1-4 dioxan and two parts of hydrochloric acid at a temperature of 45 to 50° C.

Signed at Springfield, Mass., this 3rd day of December, 1929.

CHARLES S. WEBBER.

Signed at Rochester, New York, this 6th day of Dec., 1929.

CYRIL J. STAUD.